United States Patent
Soenarjo (10) Patent No.: US 9,227,722 B2
(45) Date of Patent: Jan. 5, 2016

(54) FLAP SUPPORT

(71) Applicant: AIRBUS OPERATIONS LIMITED, Bristol (GB)

(72) Inventor: Mochamad-Agoes Soenarjo, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 550 days.

(21) Appl. No.: 13/633,976

(22) Filed: Oct. 3, 2012

(65) Prior Publication Data

US 2013/0087662 A1 Apr. 11, 2013

(30) Foreign Application Priority Data

Oct. 7, 2011 (GB) .................................. 1117340.8

(51) Int. Cl.
*B64C 3/50* (2006.01)
*B64C 9/16* (2006.01)

(52) U.S. Cl.
CPC .. *B64C 9/16* (2013.01); *Y02T 50/32* (2013.01); *Y02T 50/44* (2013.01)

(58) Field of Classification Search
USPC ........................................ 244/215, 217, 213
See application file for complete search history.

(56) References Cited

U.S. PATENT DOCUMENTS

| 4,448,375 | A | * | 5/1984 | Herndon | 244/216 |
| 5,230,487 | A | | 7/1993 | Gartelmann et al. | |
| 7,510,151 | B2 | * | 3/2009 | Perez-Sanchez | 244/213 |
| 7,600,718 | B2 | * | 10/2009 | Perez-Sanchez | 244/215 |
| 7,798,450 | B2 | * | 9/2010 | Patzelt et al. | 244/211 |
| 7,891,611 | B2 | * | 2/2011 | Huynh et al. | 244/215 |
| 8,157,208 | B2 | * | 4/2012 | Recksiek et al. | 244/99.3 |
| 8,408,499 | B2 | * | 4/2013 | Cerne | 244/213 |
| 2005/0040294 | A1 | | 2/2005 | Perez-Sanchez et al. | |
| 2008/0169383 | A1 | | 7/2008 | Patzelt et al. | |
| 2009/0127403 | A1 | | 5/2009 | Perez-Sanchez et al. | |

FOREIGN PATENT DOCUMENTS

WO 2008/129074 A1 10/2008

OTHER PUBLICATIONS

Search Report corresponding to GB1117340.8, dated Jan. 25, 2012.
Communication—Search Report in EP Appln No. 12186927.5, mailed Oct. 29, 2015.

* cited by examiner

*Primary Examiner* — Brian M O'Hara
*Assistant Examiner* — Keith L Dixon
(74) *Attorney, Agent, or Firm* — Hauptman Ham, LLP (57) ABSTRACT

A flap support structure for an aircraft wing having a trailing edge flap, the flap support structure comprising: a flap support beam including an aerodynamic fairing; and a drive unit including a universal support structure which rotatably receives a drive shaft connected to a drive arm for moving the trailing edge flap, wherein the universal support structure also forms part of the flap support beam and supports the aerodynamic fairing.

28 Claims, 7 Drawing Sheets

FLAP SUPPORT

RELATED APPLICATIONS

The present application is based on, and claims priority from, British Application Number 1117340.8, filed Oct. 7, 2011, the disclosure of which is hereby incorporated by reference herein in its entirety.

FIELD OF THE INVENTION

The present invention relates to a flap support structure for an aircraft wing having a trailing edge flap.

BACKGROUND OF THE INVENTION

Aircraft typically include flaps attached to the wing fixed trailing edge which are movable between extended and retracted positions with respect to the fixed wing. Extension of the flaps increases the lift coefficient of the wing for the high lift, low speed flight phases (e.g. take-off and landing).

There are a wide variety of flap designs (e.g. single and multiple flap elements, slotted, unslotted etc.) and flap actuation mechanisms (e.g. drop hinge, flap track etc.) to achieve a similarly wide variety of extended flap configurations and motion paths. Generally, the flap extension path includes at least some aft movement and/or downward rotation of the flap element(s). The aft movement increases the wing chord, whilst the downward rotation increases the wing camber.

The flaps may be movable between a retracted position and one or more extended positions for low speed flight. During high speed flight phases it is also known to adjust the position of the flaps by small angles (+/−10 degrees, approx.) to vary the wing camber according to the cruising speed; so-called adaptive camber wings.

Depending on the flap geometry and desired motion path it is sometimes possible to house the flap actuation mechanism and the flap hinge wholly within the wing profile. However, it is common, particularly with more complex flap deployment geometry, to support the flap from the wing using a flap support structure. The flap support structure generally includes a flap support beam which houses at least a portion of the flap deployment mechanism for moving the flap, and has an outer aerodynamic fairing to reduce drag.

Existing flap support structures tend to be relatively complex and heavy, leading to an increase in manufacturing cost and assembly time, increased maintenance cost and time, and in-service fuel costs due to the weight penalty. They also tend to have a relatively large sectional area which impacts upon drag and hence in-service fuel costs.

SUMMARY OF THE INVENTION

A first aspect of the invention provides a flap support structure for an aircraft wing having a trailing edge flap, the flap support structure comprising: a flap support beam including an aerodynamic fairing; and a drive unit including a universal support structure which rotatably receives a drive shaft connected to a drive arm for moving the trailing edge flap, wherein the universal support structure also forms part of the flap support beam and supports the aerodynamic fairing.

A further aspect of the invention provides an aircraft wing having a trailing edge flap supported from the aircraft wing by a flap support structure according to the invention.

The invention is advantageous in that the universal support structure forms part of both the drive unit and the support beam. This reduces parts count for the flap support structure, enables a modular assembly which reduces installation time, provides more efficient power transfer for moving the flap and easier adjustment of flap kinematic components.

The drive unit may further comprise an actuator mounted to the universal support structure and coupled to the drive shaft. The actuator may be removable from the drive shaft.

The drive unit may be mounted to an upper portion of the universal support structure which projects beyond the aerodynamic fairing, for positioning within a trailing edge region of the aircraft wing. In this way it becomes possible to house the drive unit partially within the fairing and partially within the wing trailing edge region. Positioning the actuator of the drive unit within the wing trailing edge region may beneficially be used to achieve a narrow flap support fairing with low drag.

The flap support beam may be configured to be supported by the aircraft wing by mounting means provided on the universal support structure. The mounting means may be provided on an upper portion of the universal support structure which projects beyond the aerodynamic fairing. These mounting means may include bearings for receiving a pin, and in particular may include spherical bearings for ease of alignment during fitting of the flap support beam to the aircraft.

The drive arm may be curved so as to avoid clashing with the pin of the mounting means. Alternatively, the drive arm may be substantially straight.

The drive arm may be fixed in rotation with respect to the drive shaft to provide a direct drive.

Preferably, the drive arm is a failsafe drive arm. The failsafe drive arm may include a primary arm and a secondary arm.

The aerodynamic fairing is preferably a structural fairing, and the flap support beam may further comprise a plurality of diaphragms for supporting the aerodynamic fairing. The flap support beam may be constructed as a modular component.

The universal support structure may be disposed approximately centrally along the length of the flap support beam. The flap support beam may have its maximum width substantially adjacent the universal component.

The aerodynamic fairing preferably has a generally U-shaped section. The flap support beam may further comprise one or more structural covers spanning between free edges of the U-shaped fairing. The covers may feature weight saving cut-outs.

The flap support structure may further comprise a linkage arrangement for coupling the trailing edge flap to the flap support beam. The linkage arrangement is preferably a four-bar linkage.

The four-bar linkage may include: a ground link comprising the flap support beam; a first grounded link comprising the drive arm which is pivotally connected at one end to the flap; a second grounded link comprising a rear link which is pivotally connected at one end to the flap and is pivotally connected at its other end to the aft end of the flap support beam; and a floating link comprising the flap.

The flap support beam may be mounted to the aircraft wing by a forward fitting and an aft fitting. Additional fittings may be provided as required. However, the provision of two fittings, fore and aft, has advantages for ease of assembly and removal of the flap support.

In one example, the aft fitting may include an aft pin coupling the universal support structure of the flap support structure to one or more aft brackets mounted on the wing. The aft brackets may be mounted on the wing fixed trailing edge on either side of the universal support structure. The aft pin preferably extends through the universal support structure and projects from either side thereof.

The forward fitting may include a forward pin coupling the flap support structure to one or more forward brackets mounted on the wing. The forward brackets may be mounted on the underside of the wing. The forward pin may be provided as a spigot projecting forwardly from the flap support beam.

The forward and/or aft fittings are preferably failsafe fittings. Each of the failsafe fittings may include a plurality of brackets and/or a failsafe pin.

The flap support beam may be accompanied by a forward non-structural aerodynamic fairing forward of the flap support structure, and an aft non-structural aerodynamic fairing aft of the flap support structure, wherein outer surfaces of the forward and aft non-structural fairings blend smoothly with an outer surface of the structural fairing of the flap support structure.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
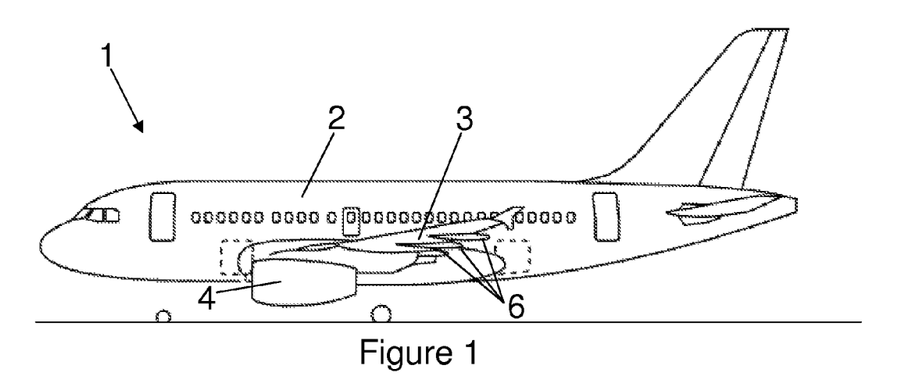
FIG. 1 illustrates a side view of a commercial passenger jet aircraft.
Figure 2:
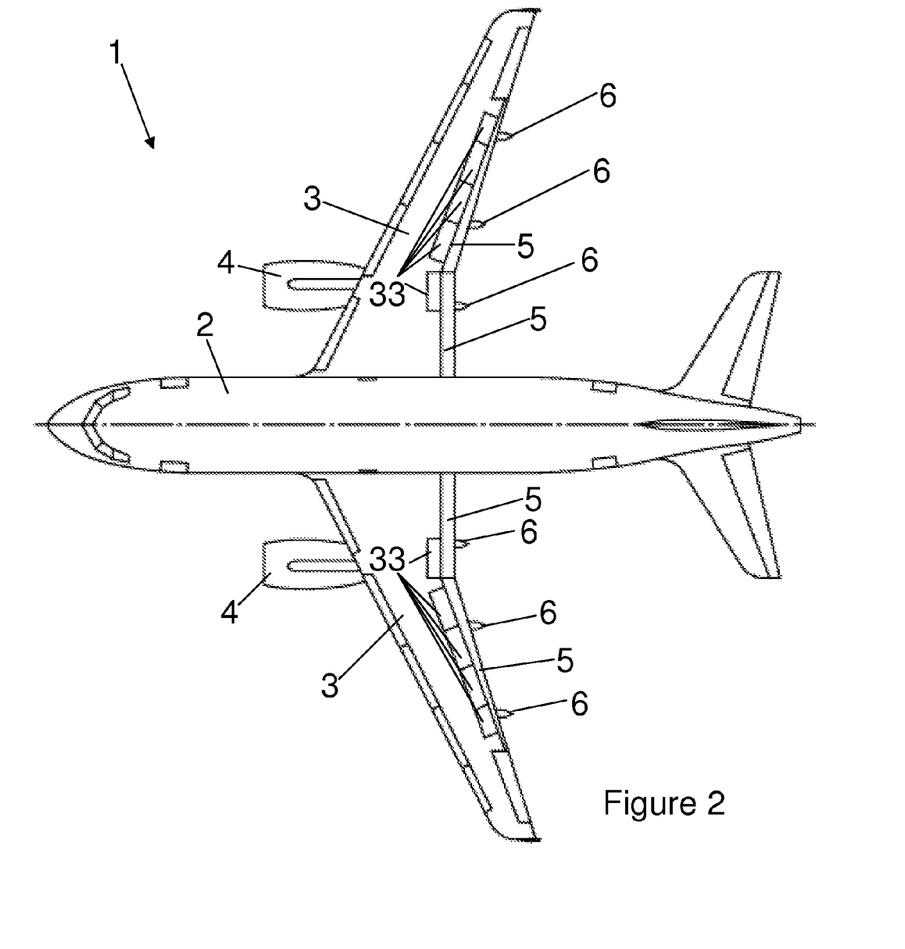
FIG. 2 illustrates a plan view of the aircraft of FIG. 1.

FIGS. 1 and 2 illustrate side and plan views, respectively, of an aircraft 1 having a fuselage 2, wings 3 and under-wing mounted engines 4. The wing 3 has moveable trailing edge flaps 5 mounted to the wing fixed trailing edge. The flaps 5 are supported by and moveable with respect to the fixed portion of the wing 3 by flap support structures 6. Whilst the aircraft shown in FIG. 1 is a commercial transport aircraft, the invention is applicable to a wide variety of aircraft types. It is also applicable to aircraft with engines mounted other than under the wing, e.g. aft mounted engines.

Figure 3:
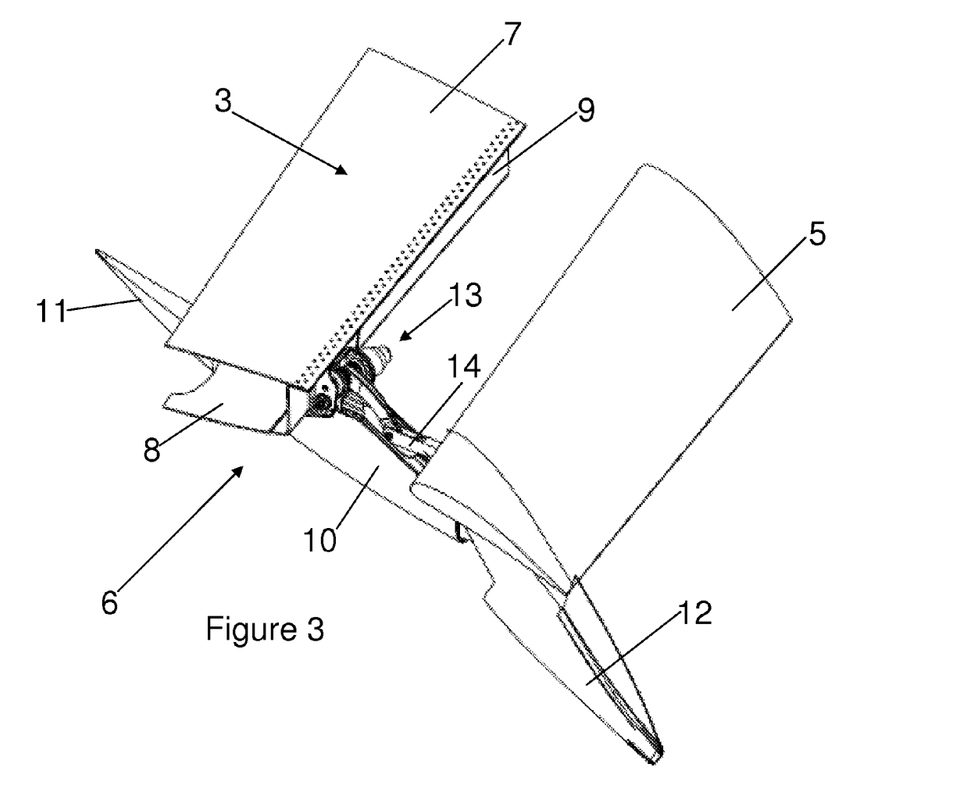
FIG. 3 illustrates a partially cut away view of the aircraft wing trailing edge showing the flap support structure with the flap in an extended position.

FIG. 3 illustrates a partially cut away view of the trailing edge of the wing 3 showing the flap support structure 6 with the flap 5 in an extended position. The wing 3 includes an upper wing cover 7, a lower wing cover 8 and a rear spar 9 which form part of a wing box structure for supporting the wing.

The flap support structure 6 generally includes a flap support beam 10, a fixed forward fairing 11 and a moveable aft fairing 12. The forward fairing 11 is fixed with respect to the fixed portion of the wing 3. The aft fairing 12 is fixed with respect to the flap 5 and moves with the flap 5 between a retracted position adjacent the wing fixed trailing edge and one or more extended positions.

A drive unit 13 for moving the flap is disposed adjacent the rear spar 9 and is partially housed within the flap support beam 10 with the remainder being housed within the wing trailing edge region. A linkage mechanism 14 is coupled between the flap 5, the flap support beam 10, and the drive unit 13 such that the drive unit 13 moves the flap 5 between its extended and retracted positions.

Figure 4:
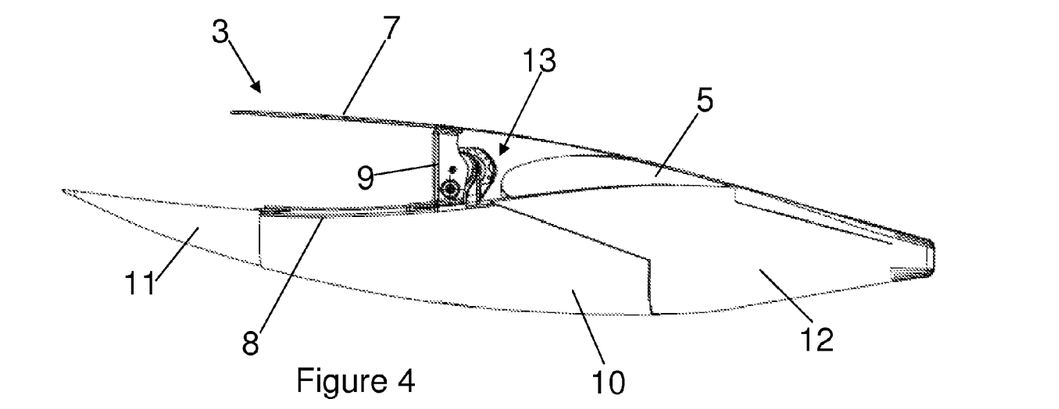
FIG. 4 illustrates a partial side section view of the wing trailing edge with the flap retracted.

FIG. 4 illustrates the aircraft wing trailing edge with the flap 5 in its retracted position in which the flap 5 is nested within the aerofoil profile of the wing 3.

Figure 5:
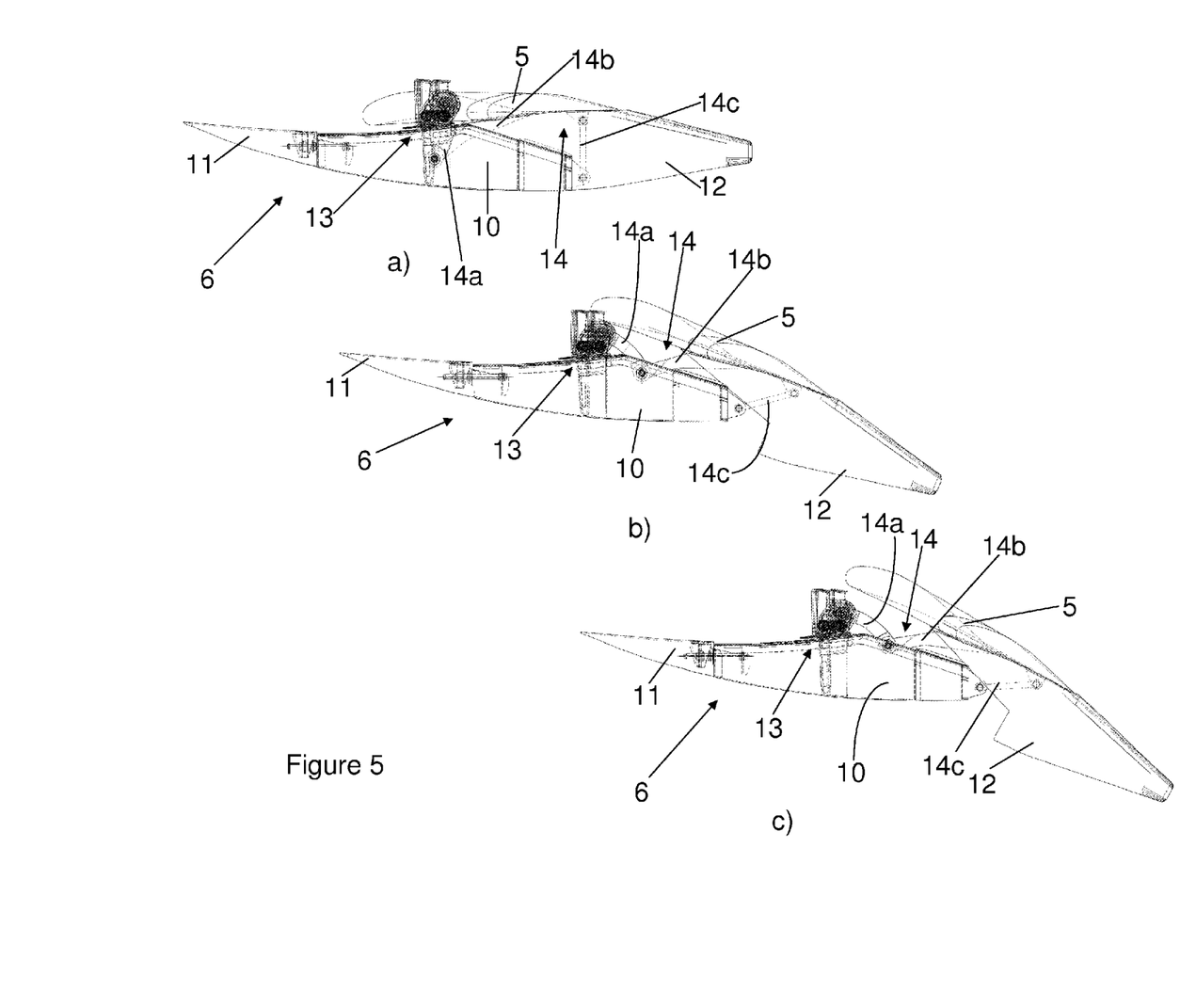
FIG. 5 illustrates a wire frame view of the wing trailing edge with the flap a) retracted, b) partially extended, and c) fully extended.

FIG. 5 illustrate wire frame images of the flap 5 and the flap support structure 6 with the flap a) retracted, b) partially extended, and c) fully extended. From the wire frame images the linkage arrangement 14 can more easily be seen. The linkage arrangement 14 is a so-called "four-bar linkage", or simply "four-bar", which includes the following main linkage elements: "ground link", first and second "grounded links", and "floating link". The basic features of a generic four bar linkage are very well known in the art, and so will not be described in detail here.

The "ground link" comprises the flap support beam 10. The "first grounded link" comprises a drive arm 14a which is coupled and fixed at one end in rotation with respect to a drive shaft of the drive unit 13. The other end of the drive arm 14a is pivotally connected to the flap 5 by a fixed flap linkage 14b extending from the underside of the flap aerofoil element. The "second grounded link" comprises a rear link 14c, which is pivotally connected at one end to the flap 5 by a bracket extending from the underside of the flap aerofoil element adjacent its trailing edge, and is pivotally connected at its other end to the aft end of the flap support beam 10. Finally, the "floating link" comprises the flap 5 itself.

As can be seen form FIG. 5, the drive arm 14a is moveable between a first position and a second position corresponding to retracted and fully extended positions of the flap 5, and passes "over centre" where the pivotal connection between the drive arm 14a and the fixed flap linkage 14b reaches its lowest point within the flap support beam 10. The aft link 14c is moveable between a first position where its longitudinal axis is aligned generally vertically (substantially perpendicular to the aircraft fore-aft direction) to a second position where it is aligned generally horizontally (substantially parallel with the aircraft fore-aft direction). The first and second positions of the aft link 14c corresponding to retracted and fully extended positions of the flap 5.

Figure 6:
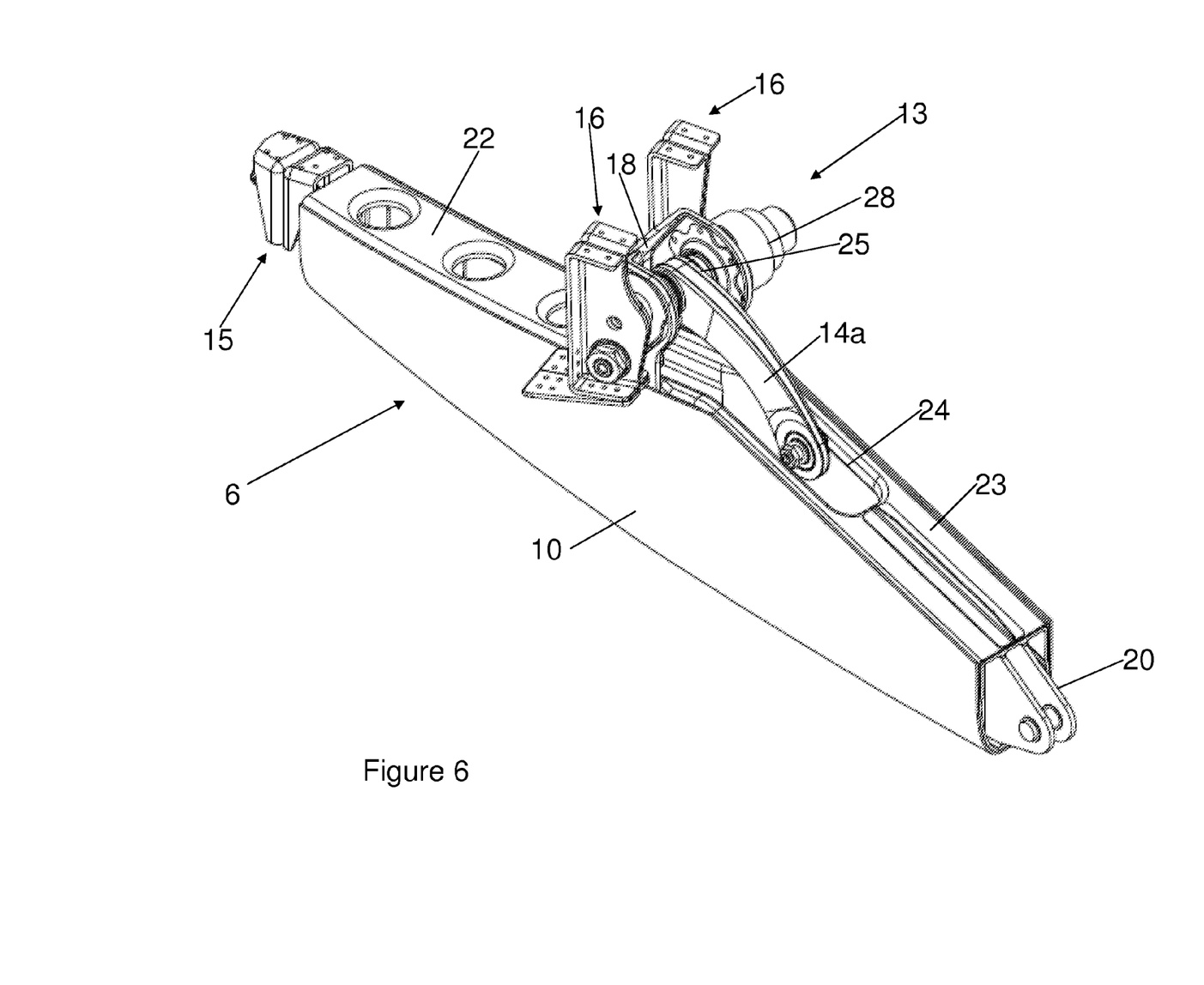
FIG. 6 illustrates a three dimensional view of part of the flap support structure showing the flap support beam, drive unit and forward and aft aircraft fittings.

FIG. 6 illustrates a three-dimensional view of part of the flap support structure 6 showing the flap support beam 10, the drive unit 13, a forward aircraft fitting 15 and an aft aircraft fitting 16. The flap support beam 10 has a modular structure so as to reduce assembly and disassembly time for attaching the flap 5 and flap support structure 6 to the aircraft wing 3.

Figure 7:
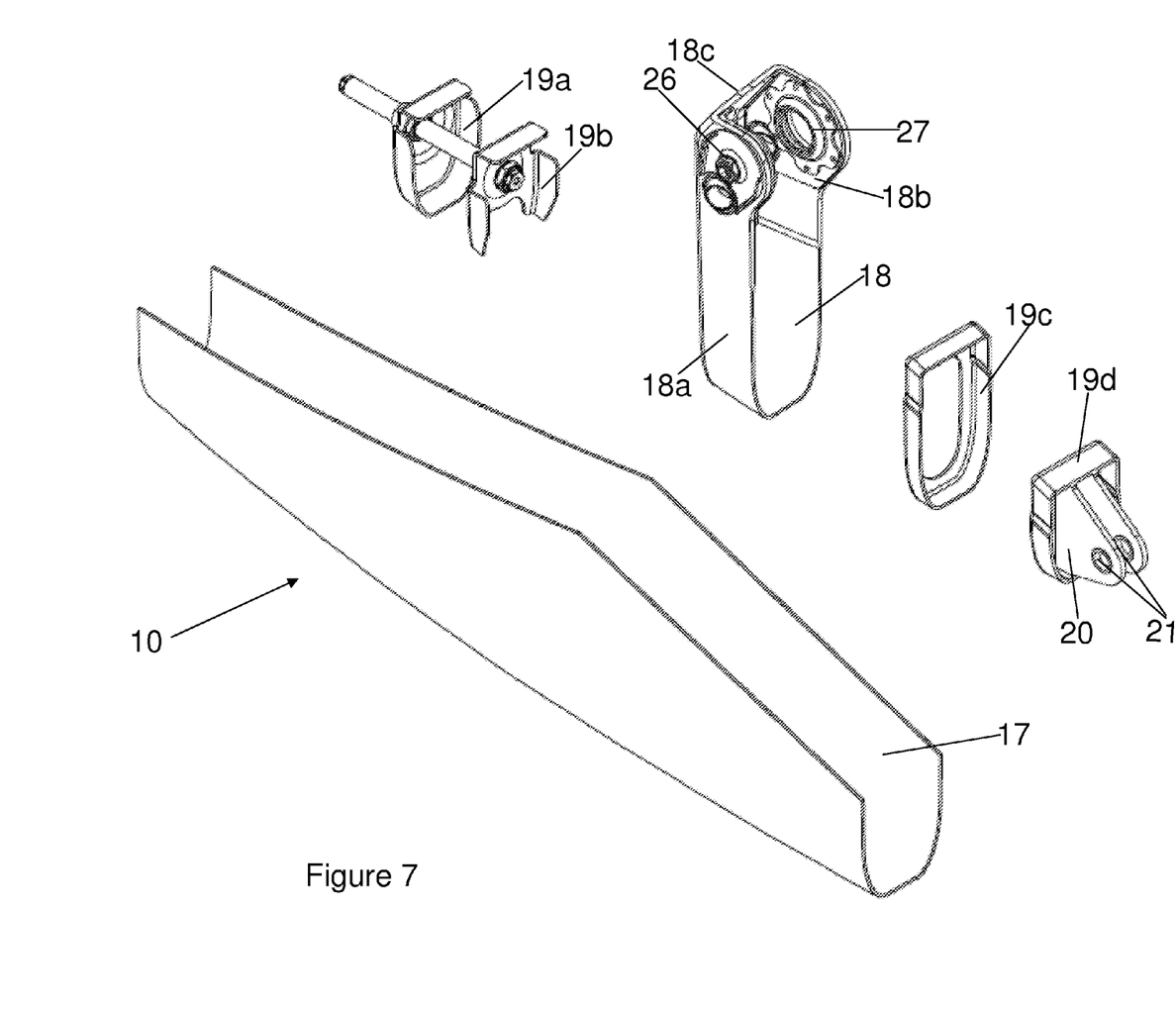
FIG. 7 illustrates an exploded three dimensional view of the flap support beam.

With reference to the exploded three-dimensional view shown in FIG. 7, the flap support beam 10 includes a generally U-shaped structural aerodynamic fairing 17, a universal support structure or bracket 18 and a plurality of diaphragms 19a-d spaced along the length of the fairing 17. The universal support structure 18 is disposed substantially centrally along the length of the fairing 17 and is fixed to the interior surface of the fairing 17. Diaphragms 19a and 19b are positioned forward of the universal support structure 18 and diaphragms 19c and 19d are positioned aft of the universal support structure 18.

The diaphragms 19a-d are each fixed to the interior surface of the fairing 17. It is to be noted that all components of the flap support structure 6 are housed either within the wing trailing edge region or the flap fairing surface, such that there is no requirement for any additional satellite fairings. The fairing 19a defines a forward end of the flap support beam 10 and the diaphragm 19d defines a rear end of the flap support beam 10. The diaphragm 19d forms part of an aft fitting which further includes an aft bracket 20 having attaching lugs 21 for pivotal connection to the rear link 14c of the four bar linkage arrangement 14. The diaphragms 19a and 19b support a forward pin 32 (described in detail later), and the diaphragm 19c is a stiffener for supporting the aft section of the support beam 10.

The fairing 17 may be formed of composite materials, e.g. carbon fibre reinforced plastic (CFRP), or any other suitable lightweight, high strength material. In a departure from known flap support structures, the fairing 17 forms an integral structural component of the flap support beam 10. It is not merely an aerodynamic cladding of a framework, as in the prior art, but is fixedly attached, or integrally formed with, the internal structures 18 and 19a-d. The modular flap support beam 10 may have a lower weight than a comparable framework supporting a non-structural aerodynamic fairing.

However, designs incorporating either structural or non-structural aerodynamic fairings are both intended. In the case where the flap support beam has a framework and non-structural fairing construction, the universal support structure will form part of the framework. The drive unit, linkage arrangement, flap and attachment of the flap support beam to the aircraft will remain substantially unchanged.

Returning to FIG. 6, the flap support beam 10 further comprises a forward upper cover 22 extending between the upper free edges of the fairing 17 forward of the universal support structure 18, and a rear cover 23 extending between the upper free edges of the fairing 17 aft of the universal support structure 18. The covers 22, 23 are fixed to the diaphragms 19a-d. As can be seen, the flap support beam 10 has a monocoque instruction in which the fairing 17 plays a predominant structural role. The structural fairing 17 together with the covers 22, 23, universal support structure 18 and diaphragms 19a-d form an enclosed, internally supported structure. The rear cover 23 includes a cut-out 24 to allow unimpeded movement of the drive link 14a and the fixed flap linkage 14b.

The universal support structure 18 not only forms a key component of the flap support beam 10 but also forms a key component of the drive unit 13. The universal support structure 18 has a complex shape including a generally U-shaped lower portion 18a leading to an upper dog leg portion 18b and supported by a forward web 18c. This shape of the universal support structure 18 provides a simple but stiff solution. The upper dog leg portion 18b is canted rearwardly with respect to the lower U-shaped portion 18a. The upper portion 18b includes lateral flanges with the web 18c providing a forward bridge between the flanges. Whereas the lower portion 18a forms part of the primary structure of the flap support beam 10, the upper portion 18b of the universal support structure 18 provide the dual function of being part of the drive unit 13 and also providing means for attaching the flap support beam 10 to the wing fixed trailing edge.

Figure 9:
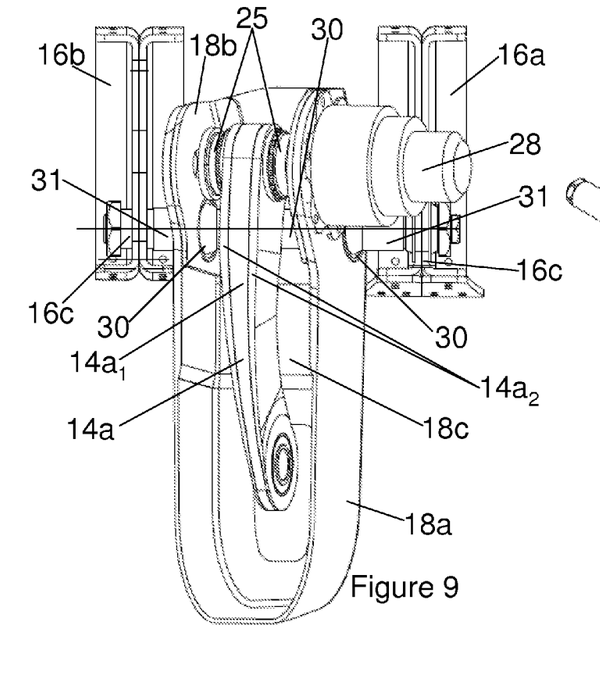
FIG. 9 illustrates the drive unit pinned to the aft aircraft fitting.

As best shown with reference to FIGS. 6, 7 and 9 the drive unit 13 includes a drive shaft 25 rotatably supported by the upper portion 18b of the universal support structure 18. The drive shaft 25 is received within bearings 26, 27 in the respective flanges of the upper portion 18b of the universal support structure. The drive shaft 25 is coupled in rotation to a geared rotary actuator 28 fixedly mounted externally on one flange of the upper portion 18b of the universal support structure. The drive arm 14a is fixed in rotation with respect to the drive shaft 25. For example, the drive shaft 25 may be splined onto one end of drive arm 14a.

The upper portion 18b of the universal support structure extends above the fairing 17. Since the actuator 28 and drive shaft 25 are mounted to the upper portion 18b of the universal support structure, the actuator 28 is disposed adjacent the rear spar 9 and the actuator 28 is disposed outside of the fairing 17. Positioning the actuator 28 in this way, combined with the four-bar linkage arrangement 14, makes it possible to provide a particularly narrow width for the flap support beam 10.

By comparison with existing state of the art flap support beams for moving similarly sized trailing edge flaps, the flap support beam 10 is approximately 50% narrower in cross-sectional width. Whilst there is a slight trade-off in that the four-bar linkage arrangement 14 requires a relatively long drive arm 14a, which in turn requires a slightly deeper fairing 17, the overall maximum cross-sectional area of the flap support beam 10 is significantly reduced as compared with the state of the art flap support beams. Not only does this smaller fairing 17 contribute less drag, but it is also significantly more lightweight as the smaller fairing 17 requires less reinforcement to achieve the required stiffness. The lower weight, lower drag solution provides improvements in reduced fuel consumption and therefore contributes to lower operating costs for the aircraft and reduced emissions.

The drive arm 14a is a failsafe drive arm and includes a primary arm $14a_1$ and a secondary arm $14a_2$ sandwiching the primary arm $14a_1$. Use of a failsafe drive arm 14a helps to ensure that a partial failure of the drive arm 14a does not lead to catastrophic failure and loss of the flap 5. The drive arm 14a need not be splined on to the drive shaft 25 and instead the drive arm may be keyed or otherwise fixed in rotation with respect to the driveshaft 25. The drive arm 14a is curved so as to avoid clash with the forward pin, but this may not be necessary in all embodiments. The driveshaft 25 may be a failsafe driveshaft and include an inner driveshaft surrounded by an outer driveshaft. These and other alternatives for ensuring safe operation of the drive unit 13 will be appreciated by those skilled in the art.

Whilst in the above described embodiment the actuator 28 is a geared rotary actuator, it will be appreciated that other types of actuators may similarly be used. For example, a variety of linear and rotary actuators are known in the art for driving aircraft flaps. It is preferable that the actuator 28 is mounted directly on the side of the universal support structure 18 in order to provide a modular flap support structure 6. However, it will be appreciated that the actuator may alternatively be mounted elsewhere within the wing trailing edge region and coupled to the drive shaft. For example, the actuator may be mounted directly on the rear spar of the aircraft wing. In either case, it is preferable that the actuator is a plug-in component for ease of installation and removal for maintenance or repair.

Figure 8:
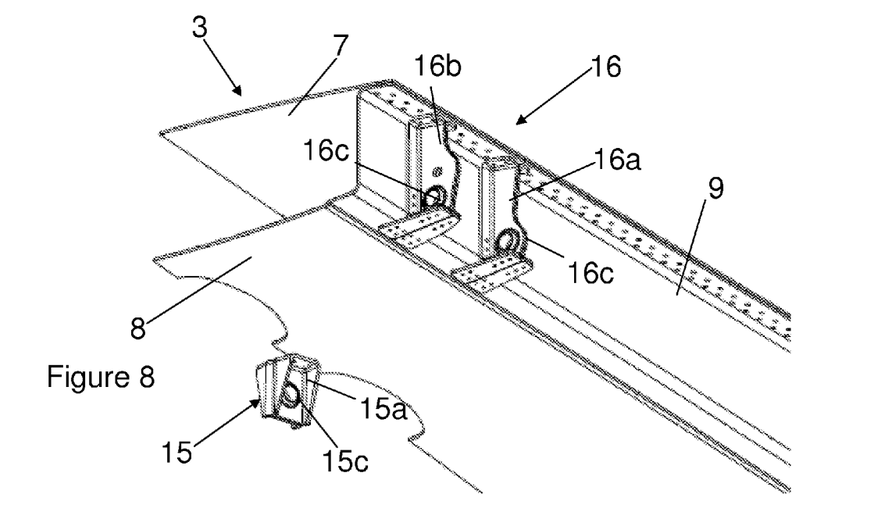
FIG. 8 illustrates a partially cut away view of the wing fixed trailing edge showing the forward and aft aircraft fittings.
Figure 10:
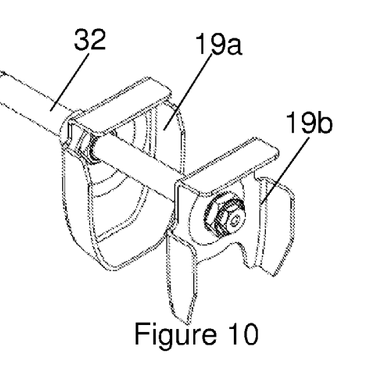
FIG. 10 illustrates a partially cut away view of the flap support beam forward spigot for attachment to the forward aircraft fitting.

Attachment of the flap support structure 6 to the aircraft wing 3 will now be described in detail with reference to FIGS. 8 to 10. FIG. 8 illustrates a partially cut-away view of the aircraft wing 3 showing the upper wing cover 7, the lower wing cover 8 and the rear spar 9. In this particular embodiment, the rear spar 9 is integrally formed with the lower wing cover 8 (which in turn is integrally formed with the front spar—now shown) in a so-called "U-box" wing box construction. The upper wing cover 7 is fastened to the upper flange of the rear spar 9 (and similarly to the front spar—not shown). However, the flap support structure 6 is equally applicable to aircraft wings having different wing box constructions, and in particular is applicable to more traditional wing box constructions having discrete front and rear spars and upper and lower wing covers. As can be seen from FIG. 8, the aft aircraft fitting 16 is mounted to the rear spar 9 and the forward aircraft fitting 15 is mounted to the lower wing cover 8.

The aft aircraft fitting 16 comprises first and second failsafe brackets 16a, 16b spaced apart along the rear spar 9 in the spanwise direction so as to receive the upper portion 18b of the universal support structure 18 of the flap support structure 6 between the failsafe brackets 16a, 16b. The brackets 16a, 16b includes pairs of bracket components arranged back-to-back to provide a failsafe fitting. Each of the failsafe brackets 16a, 16b include a high misalignment spherical bearing 16c for receiving an aft pin 29. As can be seen from FIG. 9, the aft pin 29 passes through the upper portion 18b of the universal support structure 18, which also includes high misalignment spherical bearings 30 mounted within each of the side flanges of the universal support structure 18. The high misalignment spherical bearings 30 are used because the longitudinal axis of the flap support beam 6 is offset from the normal to the rear spar 9 longitudinal axis. The flap support structure 6 is aligned with the wing chordwise direction but due to the swept trailing edge of the wing 3, the rear spar 9 is oriented at an angle to the wing spanwise direction.

The aft pin 30 is a failsafe pin comprising two concentric failsafe cylinders (e.g. of stainless steel) acting together as multiple load paths to tolerate ultimate load, and individually to tolerate the limit load. The aft pin 30 is secured in position by a locking nut at one of the pin 30. Sleeves 31 are disposed between the spherical bearings 30 of the universal support structure 18 and the spherical bearings 16c of the failsafe aft brackets 16a, 16b. The failsafe brackets 16a, 16b together act as multiple load paths to tolerate ultimate load, and act individually to tolerate the limit load. The brackets 16a, 16b may be in aluminium, for example. Any gap between the inner and outer cylinders of the failsafe pin 30 may be filled with a non-setting sealant to prevent corrosion. The four spherical bearings 16c and 30 (×2) act to eliminate induced bending on the fairing 17 and the brackets 16a, 16b of the aircraft fitting 16. The spherical bearings 16c, 30 are of the self-aligning type with a self-lubricating liner.

Returning to FIG. 8, the forward aircraft fitting 15 includes a failsafe bracket 15a having a spherical bearing 15c. The failsafe bracket 15a comprises back-to-back brackets (e.g. in aluminium) clamped together to tolerate ultimate load, and acting individually to the limit load. The spherical bearing 15c receives a forward pin 32 shown in detail in FIG. 10. The pin 32 is mounted to the forward diaphragms 19a, 19b of the flap support beam 6. The pin 32 extends between the diaphragms 19a, 19b and projects forwardly from the front diaphragm 19a as a spigot. The forwardly projecting portion of the pin 32 is received in the spherical bearing 15c and is free to slide within the spherical bearing 15c in the fore-aft aircraft direction to provide tolerance. The pin 32 is also a failsafe pin comprising inner and outer cylinders (e.g. of stainless steel) acting together as multiple load paths to tolerate ultimate load and individually to the limit load. Any gap between the inner and outer cylinders of the pin 32 is filled with a non-setting sealant to prevent corrosion. The pin 32 is secured to each of the diaphragms 19a, 19b.

Figure 11:
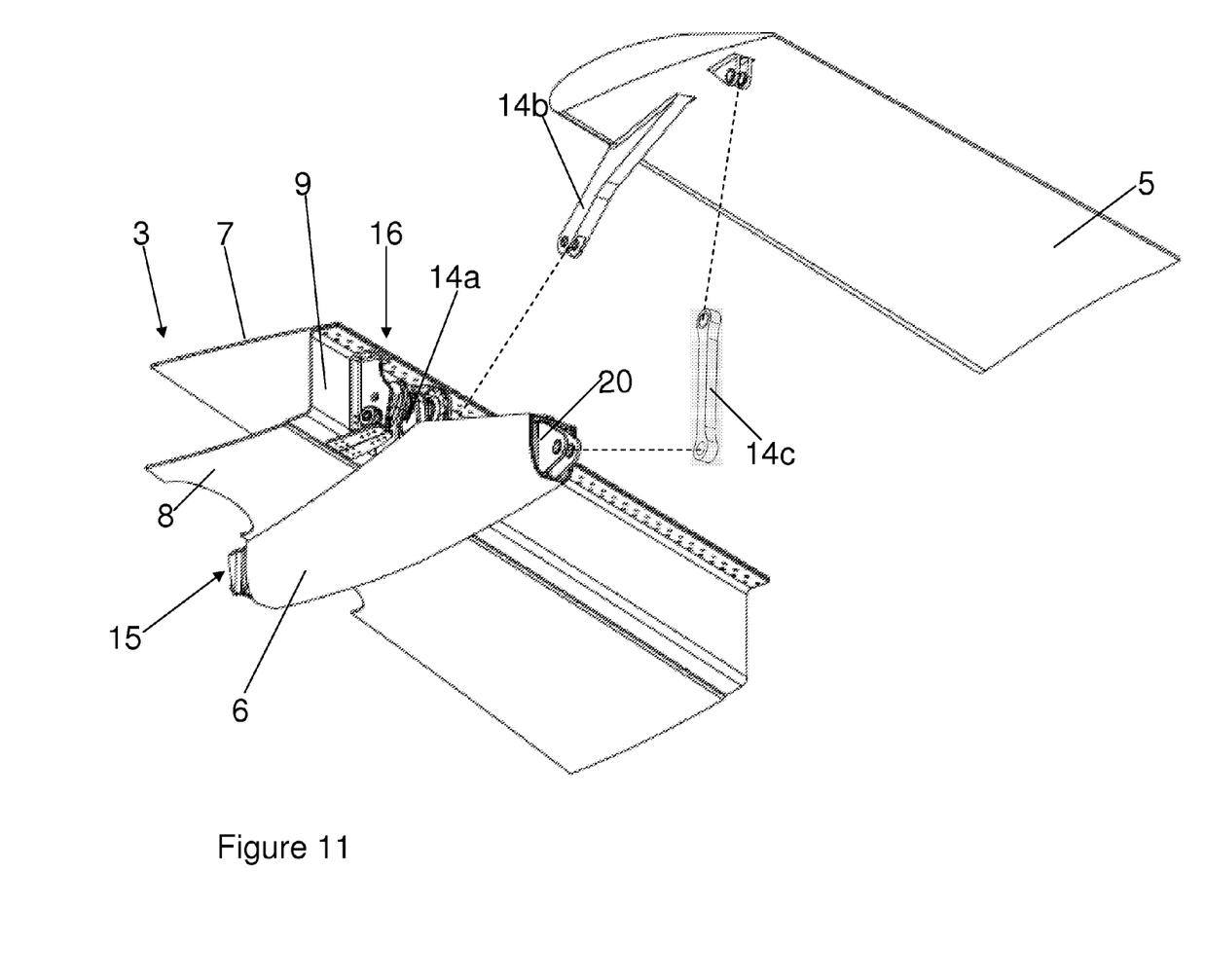
FIG. 11 illustrates assembly of the flap and its support structure to the aircraft wing.

A method of installing the flap 5 and the flap support structure 6 to the aircraft wing 3 will now be described with reference to FIG. 11. The flap support beam 6 is brought towards the lower wing cover 8 adjacent the rear spar 9. The fairing 17 has a clearance/gap with the lower wing cover 8 which is filled with aerodynamic sealant, e.g. of rubber. The forward pin 32, projecting forwardly from the front of the flap support beam 6, is slid forward through the spherical bearing 15c of the forward aircraft fitting 15 until the two spherical bearings 30 of the universal support structure 18 are brought into alignment with the two spherical bearings 16c of the aft aircraft fitting 16. The aft pin is then passed through the four spherical bearings 16c, 30 (×2) and secured in position by the pin locking nut after all gaps between the flap support beam 6 and the brackets 16a, 16b of the aft aircraft fitting 16 have been measured and suitable bushes selected.

With the flap support beam 6 secured in position with respect to the aircraft wing 3, the forward flap attachment 14b is connected to the other end of the drive arm 14a. The rear link 14c is then coupled to the rear bracket 20 of the flap support beam 6, and then to the rear flap attachment. Eccentric bearings may be provided at the flap interfaces to wash out tolerance. Vertical tolerance may also be washed out by adjustment of spoilers 33 (see FIG. 2). Finally, the forward and aft non-structural fairings 11 and 12 are attached to the wing 3 and the flap 5, respectively.

Although the invention has been described above with reference to one or more preferred embodiments, it will be appreciated that various changes or modifications may be made without departing from the scope of the invention as defined in the appended claims.

The invention claimed is:

1. A flap support structure for an aircraft wing having a trailing edge flap, the flap support structure comprising: a flap support beam including an aerodynamic fairing; and a drive unit including a universal support bracket having a bearing which rotatably receives a drive shaft connected to a drive arm for moving the trailing edge flap, wherein the universal support bracket also forms part of the flap support beam and directly supports the aerodynamic fairing.

2. A flap support structure according to claim 1, wherein the drive unit further comprises an actuator mounted to the universal support bracket and coupled to the drive shaft.

3. A flap support structure according to claim 2, wherein the drive unit is mounted to an upper portion of the universal support bracket which projects beyond the aerodynamic fairing.

4. A flap support structure according to claim 1, wherein the flap support beam is configured to be supported by the aircraft wing by mounting means provided on the universal support bracket.

5. A flap support structure according to claim 4, wherein the mounting means are provided on an upper portion of the universal bracket which projects beyond the aerodynamic fairing.

6. A flap support structure according to claim 4, wherein the mounting means include bearings for receiving a pin.

7. A flap support structure according to claim 6, wherein the bearings are spherical bearings.

8. A flap support structure according to claim 1, wherein the drive arm is curved.

9. A flap support structure according to claim 1, wherein the drive arm is fixed in rotation with respect to the drive shaft.

10. A flap support structure according to claim 1, wherein the drive arm is a failsafe drive arm and includes a primary arm and a secondary arm.

11. A flap support structure according to claim 1, wherein aerodynamic fairing is a structural fairing, and the flap support beam further comprises a plurality of diaphragms for supporting the aerodynamic fairing.

12. A flap support structure according to claim 1, wherein the universal support bracket is disposed approximately centrally along the length of the flap support beam.

13. A flap support structure according to claim 1, wherein the aerodynamic fairing has a generally U-shaped section.

14. A flap support structure according to claim 13, wherein the flap support beam further comprises one or more structural covers spanning between free edges of the U-shaped fairing.

15. A flap support structure according to claim 1, wherein the flap support structure further comprises a linkage arrangement for coupling the trailing edge flap to the flap support beam.

16. An aircraft wing having a trailing edge flap supported from the aircraft wing by a flap support structure according to claim 15.

17. An aircraft wing according to claim 16, the linkage arrangement is a four-bar linkage.

18. An aircraft wing according to claim 17, wherein the four-bar linkage includes: a ground link comprising the flap support beam; a first grounded link comprising the drive arm which is pivotally connected at one end to the flap; a second grounded link comprising a rear link which is pivotally connected at one end to the flap and is pivotally connected at its other end to the aft end of the flap support beam; and a floating link comprising the flap.

19. An aircraft wing according to claim 16, wherein the flap support beam is mounted to the aircraft wing by a forward fitting and an aft fitting.

20. An aircraft wing according to claim 19, wherein the aft fitting includes an aft pin coupling the universal support bracket structure of the flap support structure to one or more aft brackets mounted on the wing.

21. An aircraft wing according to claim 20, wherein the aft brackets are mounted on the wing fixed trailing edge on either side of the universal support bracket.

22. An aircraft wing according to claim 20, wherein the aft pin extends through the universal support bracket and projects from either side thereof.

23. An aircraft wing according to claim 19, wherein the forward fitting includes a forward pin coupling the flap support structure to one or more forward brackets mounted on the wing.

24. An aircraft wing according to claim 23, wherein the forward brackets are mounted on the underside of the wing, and the forward pin is provided as a spigot projecting forwardly from the flap support beam.

25. An aircraft wing according to claim 19, wherein the forward and/or aft fittings are failsafe fittings.

26. An aircraft wing according to claim 25, wherein each of the failsafe fittings include a plurality of brackets and/or a failsafe pin.

27. An aircraft wing according to claim 16, wherein the flap support structure includes an actuator for moving the flap, and the flap actuator is disposed within the wing profile and outside of the flap fairing.

28. An aircraft wing according to claim 16, further comprising a forward non-structural aerodynamic fairing forward of the flap support structure, and an aft non-structural aerodynamic fairing aft of the flap support structure, wherein outer surfaces of the forward and aft non-structural fairings blend smoothly with an outer surface of the structural fairing of the flap support structure.

* * * * *